(12) United States Patent
Cornelissen et al.

(10) Patent No.: US 8,388,209 B2
(45) Date of Patent: *Mar. 5, 2013

(54) LAMP AND USE THEREOF

(75) Inventors: Hugo Johan Cornelissen, Eindhoven (NL); Martinus Hermanus Wilhelmus Maria Van Delden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/176,114

(22) Filed: Jul. 5, 2011

(65) Prior Publication Data

US 2011/0261582 A1    Oct. 27, 2011

Related U.S. Application Data

(63) Continuation of application No. 12/444,410, filed as application No. PCT/IB2007/054056 on Oct. 5, 2007, now Pat. No. 7,997,782.

(30) Foreign Application Priority Data

Oct. 9, 2006  (EP) .................................. 06121985

(51) Int. Cl.
*F21V 7/04* (2006.01)
(52) U.S. Cl. ......... 362/623; 362/601; 362/613; 362/608
(58) Field of Classification Search .................. 362/609, 362/611, 612, 613, 620, 331
See application file for complete search history.

(56) References Cited

U.S. PATENT DOCUMENTS

| | | | |
|---|---|---|---|
| 6,147,725 A | 11/2000 | Yuuki | |
| 6,249,328 B1 | 6/2001 | Fukuzawa | |
| 7,076,148 B2 | 7/2006 | Nemoto | |
| 7,088,905 B1 | 8/2006 | Nemoto | |
| 7,997,782 B2 * | 8/2011 | Cornelissen et al. | 362/613 |
| 2001/0010630 A1 | 8/2001 | Umemoto | |
| 2002/0061178 A1 | 5/2002 | Winston | |
| 2005/0122707 A1 | 6/2005 | Kim | |

FOREIGN PATENT DOCUMENTS

| | | |
|---|---|---|
| DE | 10207694 A1 | 11/2003 |
| JP | 09269487 A | 10/1997 |
| JP | 10232633 A | 9/1998 |
| WO | 0151850 A1 | 7/2001 |
| WO | 02097324 A1 | 12/2002 |
| WO | 2005019724 A1 | 3/2005 |

* cited by examiner

*Primary Examiner* — Ali Alavi (57) ABSTRACT

A lamp for emitting light, comprising a transparent sheet-like lightguide, with at least one light receiving side, a light emission front surface and a back surface opposite the front surface. The lamp further comprises a plurality of light sources, positioned in an array and optically coupled to at least one light receiving side. The back surface of said lamp comprises a plurality of optical extraction structures, for example provided in parallel curved lines. Furthermore, the lamp is substantially free from light scattering structures in a light path of the light to be emitted.

18 Claims, 4 Drawing Sheets

LAMP AND USE THEREOF

This application is continuation of 12/444,410 filed on Apr. 6, 2009 now U.S. Pat. No. 7,997,782, which is national stage entry of PCT/IB2007/054056 filed on Oct. 5, 2007.

FIELD OF THE INVENTION

The invention relates in general to a lamp. In particular, the invention relates in a first aspect to a lamp for emitting light, comprising a transparent sheet-like lightguide, with at least one light receiving side, a light emission front surface and a back surface opposite the front surface, and a plurality of light sources, positioned in a linear array and adjacent at least one light receiving side, wherein the back surface comprises a plurality of reflective optical extraction structures.

BACKGROUND OF THE INVENTION

So-called backlights of e.g. liquid crystal displays generally have a similar construction, comprising a side-lit lightguide, and extraction features to extract the light out of the lightguide. Such backlights may e.g. be relatively flat lamps that still have a large light emitting area. Often, these backlights have to fulfill the requirement of providing lighting as homogeneously as possible, and in particular the light extraction structures are adapted to this goal.

However, a disadvantage of such backlights, or lamps of this kind in general, is that the direction of the emitted light is much less well-defined. A desirable control over lighting properties cannot be obtained with such lamps with homogeneously, yet substantially randomly, emitted light.

It is an object of the present invention to provide a flat lamp having the known advantages of the known lamp, but that in addition is able to emit light with a better-defined behavior. This better-defined behavior in turn can provide special properties hitherto not supplied by e.g. backlights.

SUMMARY OF THE INVENTION

The above object is achieved with a lamp according to claim 1, in particular a lamp for emitting light, comprising a transparent sheet-like lightguide, with at least one light receiving side, a light emission front surface and a back surface opposite the front surface, and a plurality of light sources, positioned in an array and optically coupled to at least one light receiving side, wherein the back surface comprises a plurality of optical extraction structures, and the lamp is substantially free from light scattering structures in a light path of the light to be emitted. By leaving out light scattering structures, such as diffuser foils or diffusive (scattering) particles, the lamp according to the invention provides a flat lamp with a large light emitting area, wherein the light has well-defined properties. These properties relate particularly but not exclusively to a well-defined polarization state, which allows various manipulations, as will be shown below.

It is noted that in this respect a liquid crystal device is also considered to be a light scattering structure. In general, a display comprising a backlight and a liquid crystal device is not intended to be comprised in the scope of the present invention.

In a special embodiment of the lamp according to the invention, the front surface, the extraction structures and the back surface comprise optically flat surfaces. Such optically flat surfaces help in maintaining a well-defined polarization state, since e.g. a varying thickness of the lightguide or an irregular surface could alter that polarization. In this respect, a surface is called optically flat if it has an average surface roughness $R_a$ of less than 2% of the wavelength of the used light. Since for optical applications with visible light the average wavelength is about 500 nm, the surfaces are optically flat if that roughness $R_a$ is at the most about 10 nm, preferably smaller such as smaller than 5 nm. Obviously, the back surface is taken to be that part of the back surface that extends around the extraction structures, which are inherently needed to extract light from the lightguide.

In a particular embodiment, the extraction structures comprise mirroring surfaces. By suitably positioning the mirroring surfaces, light that is guided in the lightguide by total internal reflection may be reflected such that it is able to leave the lightguide. Depending on the index of refraction of the material of the lightguide, and on the desired exit angle, the angle of the mirroring surfaces with respect to the back surface may be selected. Suitable angles are between about 30 and 60°, preferably around 45°. The mirroring surfaces may comprise surfaces machined or recessed into the lightguide, or may comprise external surfaces, such as prism surfaces.

In a special embodiment, the extraction structures are mutually separated by a distance of at least 2 mm, preferably at least 5 mm This relates to a special effect that was discovered by the inventors. When looking at the lamp, the extraction structures, i.e. for example the mirroring surfaces, will reflect the light from the light sources. This will cause a virtual image of each of the light sources to be made for every extraction structure. These images will have an intensity that depends on the dimensions of the extraction structure, e.g. an intensity that diminishes away from the real light sources, if the extraction surfaces are all equal. A more important effect as found by the inventors is that, especially when looking at the lamp at a non-zero angle with respect to a plane perpendicular to the array of light sources (e.g. if the array of light sources are at the lower side of the lamp, when looking from the sides), the virtual images of the light sources seem to "run off" into the distance. This means that, the further the viewer is from the real light sources, the deeper into the lamp the virtual images are perceived. This means that the flat lamp has a perceived depth. This 3D-effect may be observed because the light as extracted by the extraction structures is well-defined. The individual images of the light sources would be blurred into one mass of light if the lamp were to comprise light scattering means, or irregular extraction surfaces et cetera. Now, with the above mutual distance between the extraction structures, it is easily possible for the viewer to separate the separate virtual images. If the virtual images were too close together, they would coalesce into a single light field, which would suppress the 3D-effect.

A suitable height of the extraction structures would be up to about 25 μm, preferably between about 5 and 15 μm. This allows sufficient light to be extracted, without interfering too much with the guiding of light within the lightguide. Note however that this relates to lightguides of say 2 mm thickness. The dimensions may scale up or down with the lightguide thickness, and a more general rule could be that the height of the structures could preferably be about 0.1-2% of the thickness of the lightguide.

Furthermore, it is to be stressed that this 3D-effect is also perceivable if there is only one light source, either one LED or other small light source, and also in the case of a single linear light source, such as a thin fluorescence lamp. However, this is much less clearly visible, inter alia because variations in intensity along the array of light sources are not present (or very much less so), and it also depends more strongly on side effects, as will be discussed further below.

In a particular embodiment, the extraction structures are provided on curved lines. In this embodiment, the virtual images of the light sources also seem to lie on curved lines. In this way, there can be provided a lamp with various simulated depth profiles. These lines may be parallel lines, including concentric lines. Also other groups of lines or line structures are possible, depending on the desired (3D) appearance of the lamp.

In a special embodiment, the sides of the lightguide that extend perpendicularly to the array of light sources are substantially non-reflecting. This helps in obtaining the perceived depth effect. Since, in this case, the sides do not reflect light, no virtual images "to the sides" of the lamp are generated. This means that, when looking at the lamp from the side, at the far end of the lamp a dark part will become visible, at which part no virtual image is present to emit light. In the case of a rectangular front surface of the lightguide and of extraction structures lying on straight lines, the dark part will be a triangle. With other shapes, or curved lines for the extraction structures, the dark part may have a different shape. It is especially this dark virtual side wall which enhances the perceived depth, all the more so since this dark part only appears when looking from the sides. When shifting the viewpoint from "right in front" to "from the side", at first there is no dark part, but it gradually grows as the viewpoint shifts, just as would a real dark sidewall. Note that the effect becomes also visible when the respective sides of the lightguides reflect visibly less than 100% of the light, such as 80% or less. However, for the effect to be impressive, it is advantageous if the reflectance is at most 25%, and preferably as small as possible, such as 5% or less.

In an advantageous embodiment, the plurality of light sources comprises a plurality of LEDs, in particular a plurality of white light LEDs. LEDs provide a bright and useful all round light that can easily be coupled into the light guide, due to their small dimensions.

In a particular embodiment, the plurality of light sources comprises a plurality of LEDs, at least two neighboring LEDs being arranged to emit light of a different color. This allows an even stronger 3D perception, since the virtual images will now become quite clearly visible, e.g. as colored lines perpendicular to the curves on which the extraction structures lie; in many cases these lines extend perpendicularly to the array of light sources.

The light sources need not be LEDs, but could also be other spatially separated light sources. In a particular embodiment, the light source comprises a central light generating means and a plurality of optical fibers. The light generating means could again be an LED, but also any other "lamp", such as an incandescent lamp, a (high pressure) discharge lamp, etc. Because of the optical fibers, this light generating means may be positioned away from the lamp of the present invention, i.e. from the lightguide, which may still be flat. The other ends of the optical fibers may then be considered the light sources in the lamp according to the present invention.

In a special embodiment, the plurality of light sources comprise a linear light source, preferably a fluorescent lamp, further comprising a light division structure adjacent the fluorescent lamp, arranged to divide a light emitting surface of the fluorescent lamp into a plurality of light emitting sub-surfaces. Such a light division structure could be a mask, or the like, such as an opaque foil with one or more apertures. In this way, a single light source may be used, which decreases the complexity of the lamp. Furthermore, different effects are easily obtainable by simply changing the light division structure, without having to change anything about the light source (or an array of light sources).

In a particular embodiment, the array of light sources comprise an arrangement which extends in more than one dimension, in particular more than two dimensions. In a special embodiment, a plurality of light sources are present on a curve. Especially, the arrangement comprises at least two rows of light sources. This allows the creation of additional 3D effects, in that suitable positions for the light sources may be selected, such that their virtual images may be observed in desired positions.

In an even more special embodiment, at least one light source is moveable in at least one direction, with respect to the light guide. Note that this may also be an aperture of the light division structure. By providing the light sources on a curve, the virtual images may also be provided on a curve, which is itself mirrored in the extraction structures. By making at least one light source moveable, the virtual images may also be made moveable. All this allows the creation of more 3D effects, still without increasing the thickness of the lamp. The lamp may advantageously comprise at least one light source actuator, for moving the light source(s). Such actuators may comprise piezo-electrical actuators, or other mechanical, hydraulic, magnetic actuators. The actuators may move the light sources themselves, such as the LEDs or the (ends of the) optical fibers, or may move, rotate etc. the light division structure.

Alternatively, the light sources could also comprise a light emitting device, of any kind mentioned above, and one or more, preferably moveable, mirrors. In this way, too, the virtual images may be made to move in the eyes of the viewer.

In an advantageous embodiment, the lamp comprises a circular polarizer positioned in front of the front surface and a mirror positioned adjacent the back surface. This further enhances the 3D effect, in that it effectively suppresses reflections of ambient light. As is known to the skilled person, incident ambient light is blocked by the circular polarizer for the part with a selected polarization. The remaining part with the complementary polarization will pass the polarizer. At the mirror, the light is reflected while at the same time the polarization is flipped. This light will subsequently also be blocked by the polarizer. In all, substantially all of the incident light is absorbed by the polarizer. This means that the effects visible in the lamp are very pronounced, and not bluffed by reflections of ambient light.

It is to be noted that with the above feature, there is also provided a flat lamp in general, that has a very low reflection, and thus a very high contrast between brightness in the "on" and the "off" state. One could also state that the visibility of the lamp is improved. To achieve this, the invention provides a lamp for emitting light, comprising a transparent sheet-like lightguide, with at least one light receiving side, a light emission front surface and a back surface opposite the front surface, and at least one light source, positioned adjacent a light receiving side, the back surface comprising a plurality of optical extraction structures, and the lamp being substantially free from light scattering structures in a light path of the light to be emitted, and the lamp comprising a circular polarizer positioned in front of the front surface and a mirror positioned adjacent the back surface.

In the above embodiments, it is also advantageous when the lamp is substantially free from light scattering structures in a light path of the light to be emitted, since that ensures that the polarization of the ambient light that passes the circular polarizer is not changed, apart from the flip at the mirror. This in turn ensures full absorption of the ambient light.

In a particular embodiment, the lightguide has a retardation of less than 20 nm This ensures an extinction rate of at least 98% of the ambient light. Of course, a retardation that is as low as possible is preferred.

In an advantageous embodiment, the front surface is directly visible. This is to be taken to mean that the front surface is substantially free from, i.e. not covered by, a structure that prevents the front surface from being seen by an observer. It is not intended to comprise transparent structures that still allow a view of that front surface. All this relates in particular to separate structures of the kind mentioned above, namely diffusers, liquid crystal devices and so on.

In a particular embodiment, the lightguide comprises parallel first and second lightguide parts. This further broadens the gamut of effects obtainable. E.g., the lightguide parts may be provided side-by-side, with different extraction structures, or may be lying on different curves/lines. It is also possible to provide the lightguide parts so as to be overlapping, i.e. having at least partly overlapping respective front surfaces. In such a case, virtual images as created by the lightguide parts may also be overlapping. E.g., in an advantageous embodiment, the lamp further comprises two arrays of light sources, and respective light receiving sides of the first and second lightguide parts are optically connected to one of the two arrays of light sources.

In a particular embodiment, the two arrays of light sources are arranged on different, preferably opposite, sides of the lamp. This may simply be used to enhance the brightness of the lamp, but also to add various effects in one lamp.

In another embodiment, the first lightguide part has a light receiving side positioned adjacent the array of light sources, and the second lightguide part is optically connected to the first lightguide part by means of a mirror device. In this embodiment, one array of light sources, or one light source, suffices to provide two lightguide parts with light. The optical connection may be embodied in any desired fashion, such as fiber optics. Preferably however, the connection is established by means of a suitable prism, through total internal reflection.

In an advantageous embodiment, the first lightguide part is substantially free from extraction structures. In this embodiment, the light from the light source(s) first passes the first lightguide part without being extracted. On extraction in the second lightguide part, the perceived depth of the virtual images is, however, larger than would be the case for extraction in the first lightguide part. This ensures that the perceived depth increases. Of course, it is possible to keep increasing the depth by adding more and more lightguide parts with a suitable optical connection, although there will be some intensity loss. Furthermore, it is also possible to provide also the first lightguide part with extraction structures, which would then also create virtual images.

In a particular embodiment, the first and second lightguide parts comprise a part at respective, mutually opposite light receiving sides thereof that is free from extraction structures. In particular, substantially half of the respective lightguide part is free from extraction structures, although other ratios are also possible. In an advantageous embodiment, the lamp according to the invention further comprises two arrays of light sources, and two lightguides with extraction structures and with opposite light receiving sides. In such a case, it is possible to provide a lamp having a perceived depth that has a minimum in the center of the lamp, in particular with overlapping lightguides and opposite arrays of light sources.

The invention also provides a lamp for emitting light, comprising a transparent sheet-like lightguide, with at least one light receiving side, a light emission front surface and a back surface opposite the front surface, and at least one light source, positioned adjacent a light receiving side, and a circular polarizer positioned in front of the front surface, a mirror being provided which is positioned adjacent, and preferably in contact with, the back surface, the front side comprising a plurality of optical extraction structures, the extraction structures comprising recesses in the lightguide that are filled with a birefringent material, and the lamp further comprising additional birefringent material that is positioned between the circular polarizer and the birefringent material of the extraction structures. This provides the possibility to influence on the one hand the ambient light, along the same optical mechanism as described above, and on the other hand to influence the amount of light that is extracted by the lightguide. In principle, without the additional birefringent material, the following would happen.

The birefringent material in the recesses should be selected such that its refractive index for either the fast or the slow axis is substantially equal to that of the refractive material of the lightguide. In that case, the part of the light with the suitable polarization 'sees' only a lightguide and passes the filled recess unhindered, while the part with the opposite polarization can be refracted out of the lightguide. The unhindered part then reflects at the mirror and can be made to flip its polarization, which means that at the next encounter with a recess, it will leave the lightguide. Hence, all light can leave the lightguide, and it will all have the same linear polarization. Half of this extracted light would then be absorbed by the circular polarizer. If the additional birefringent material is now provided with a suitable thickness, i.e. retardation, and orientation of the fast (or slow) axis, the linearly polarized light can be made to pass the circular polarizer unhindered, while ambient light is still fully absorbed.

This provides a lamp having about 100% light extraction efficiency, while still suppressing reflection of ambient light.

Note that exactly the same structure as described above may be provided in the other lamps according to the invention.

In a special embodiment, the lamp is substantially free from light scattering structures in a light path of the light to be emitted, in particular, but not exclusively, it is free from LC devices. Again, the embodiment has optimum efficiency if changes to the polarization state are at a minimum.

The invention also provides the use of a lamp according to the present invention for illumination in a building. The use of the inventive lamps provides great advantages, e.g. in that lighting may be provided which is not reflecting by itself In other words, if the lamp is off, it appears rather black. This offers advantages in circumstances where there should be little light, while the possibility of providing lots of light if desired is available. This is for example the case in (movie) theatres, clubs, discotheques et cetera. Known lamps would comprise some kind of reflector, diffuser etcetera, which shine whitish even when the light source is off. This is not desired in the establishments mentioned.

Other possible uses include the use in a building where e.g. only a small space is available. Because of the 3D effect, the impression of a larger room may be given by the flat lamp according to the invention.

In particular, the lamp is mounted on or in a wall, floor or ceiling of the building. Alternatively, the lamp is mounted in a base and is positioned in free space. In both cases, the space occupied by the lamp is small, while the impression of spaciousness can be rather high, which may be desired in cases where the total actually available room is small, like inside an elevator A particularly advantageous use according to the invention is, in particular, in an outdoor environment. In such a case, a flat lamp is provided that has a very small reflection of ambient light (glare), which ensures that the light emitted by the lamp itself is better visible. In particular, the lamp is used in a traffic sign, such as a traffic lamp. Alternatively, the lamp may be used in other signs for which improved visibility is desired, such as advertisements, warning signs et cetera.

The invention also provides a building provided with a lamp according to the invention, with the advantages already mentioned above. In particular, the lamp is provided on a wall, and in particular not behind a screen, i.e. without LCDs. In other words, LCD displays such as TV sets are excluded here.

DETAILED DESCRIPTION OF EMBODIMENTS

Figure 1:
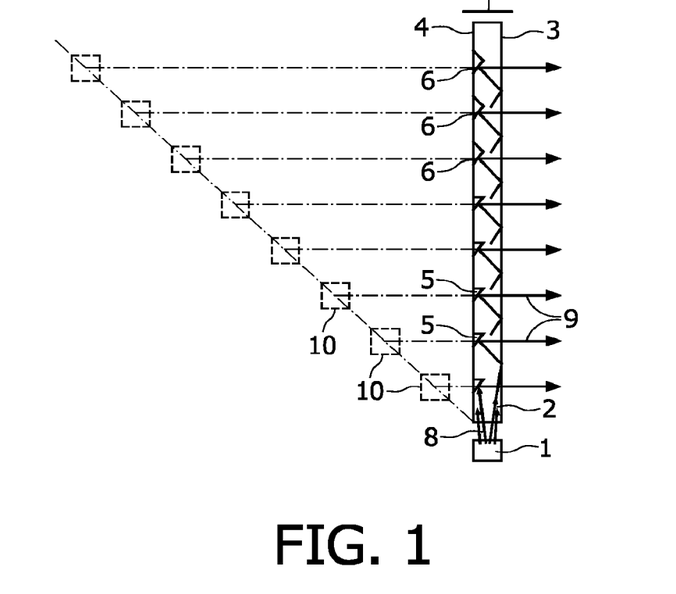
FIG. 1 very diagrammatically shows a lamp according to the invention, in a cross-sectional side view, with a 3D appearance.

FIG. 1 very diagrammatically shows a lamp according to the invention, in a cross-sectional side view, with a 3D appearance.

Herein, 1 denotes an LED and 2 a lightguide with a front surface 3 and a back surface 4. In the lightguide there are a plurality of extraction structures 5 and 6. A mirror is denoted with reference numeral 7.

LED 1 emits a (narrow) bundle of light 8 that enters the lightguide 2. The light is guided by total internal reflection at the front surface 3 and the back surface 4. If necessary, the light is reflected back by mirror 7.

A part of the light will be incident on the extraction structures 5, either directly or after a number of reflections, as partly indicated by dashed lines. The extraction structures 5 are recesses that are e.g. machined into the lightguide, and that comprise a reflection surface at an angle e.g. between 30 and 50°. The light that is incident on the extraction surfaces is reflected to the front surface 3 and is able to leave the lightguide 2. Of the bundles that thus leave the lightguide 2, a number of parallel rays 9 are shown, although in fact each extraction structure emits also a bundle of rays. However, these rays 9 indicate one of the directions from which light is perceived by a (distant) viewer.

To a distant viewer, the rays 9 will be perceived to be emitted by virtual images 10 of the LED 1. Each of the extraction structures 5 will provide one virtual image. The further away the extraction structure 5 is from the original and real LED 1, the more distant the virtual image 10 will appear. This way, the lamp will be perceived as having a depth, although the lamp is of course actually flat.

The extraction structures 6 have a symmetrical structure, which allows them to also reflect light coming from above, i.e. light reflected by the mirror 7. Although this allows more light to be extracted, it also creates a second virtual image at roughly the same vertical position as a virtual image that is created by light coming from below, but at a different perceived depth. This may blur the actually perceived depth, so the mirror is only optional.

In this context, it is important to note that the lightguide 2 is essentially free from scattering structures, such as incorporated particles or a diffuser screen or the like. Likewise, the surfaces of the extraction structures 5 should also be non-scattering, and in this case they should be optically flat. In this way, directions et cetera of the light are always well-defined.

Figure 2:
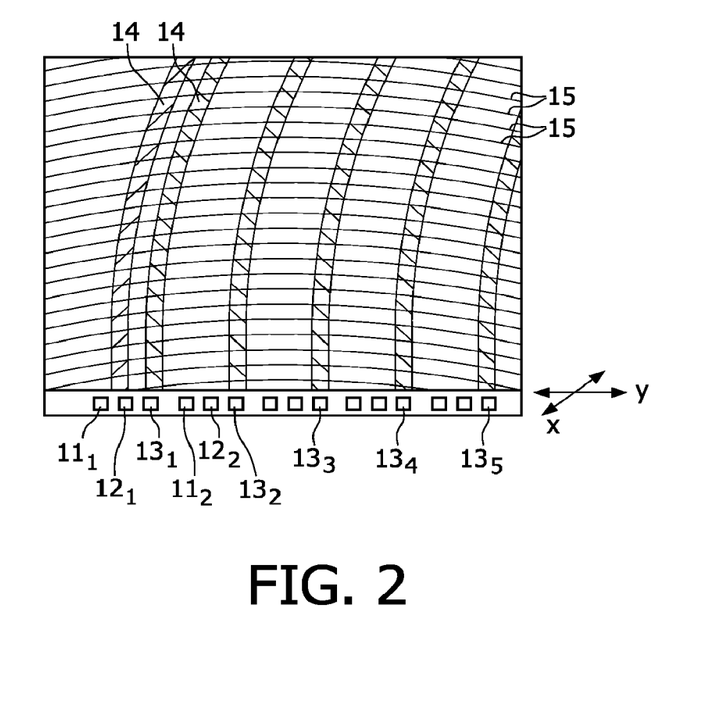
FIG. 2 shows a diagrammatic front view of a lamp according to the invention.

FIG. 2 shows a diagrammatic front view of a lamp according to the invention. An array of LEDs is denoted $11_1$, $12_1$, $13_1$, $11_2$, $12_2$, $13_2$, $13_1$, $13_2$, $13_3$, . . . ; virtual images are shown on substantially vertical lines or curves 14. Curves of extraction structures are denoted by 15.

In this case, the extraction structures do not lie on straight lines but on concentrical lines. This causes the virtual images 14 not to lie on straight vertical lines, but also on curved lines, as shown here. These curves may help in enhancing the depth perception. The curves 15 may also be composed of a number of shorter lines or curves, and could have many different shapes.

The light sources are an array of LEDs, in this case 3 LEDs for each light source, such as a red, a green and a blue LED, that together may emit white light. Note however that the virtual images in the lamp are not blurred, and that at not too far distances the lamp will appear colored. Alternatively to the RGB-LED groups, e.g. white light LEDs may be used, or a thin lamp with a suitable 'mask', or optical fibers et cetera.

The light sources are shown as being arranged on a single straight line, but they could be provided on more, parallel lines, or other groups and arrangements. Furthermore, they could also be made so as to be moveable, for example in the x and y direction as indicated by arrows. To this end, suitable actuators could be provided (not shown here). The virtual images in lines 14 could then also move, i.e. in the eyes of the viewer.

Figure 3:
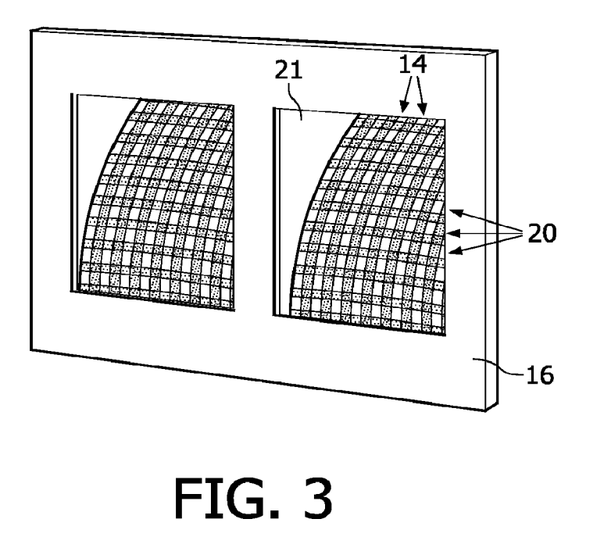
FIG. 3 shows a perspective view of a lamp according to the invention.

FIG. 3 shows a perspective view of a lamp according to the invention. The lamp comprises a housing 16 with two apertures for two sub-lamps. Each sub-lamp comprises an array of LEDs (not directly visible), each of which projects a series of virtual images, visible as more or less vertical lines 14. Likewise, the array of LEDs is imaged as a more or less horizontal series of virtual images 20, between which narrower darker bands are visible.

Furthermore, a dark "virtual sidewall" 21 is visible. The virtual dimensions of this dark sidewall 21 vary as the angle at which a viewer looks at the lamp is changed, just like a lamp with a real depth. This contributes very much to the "depth" of the lamp according to the invention. The visibility of this sidewall 21 may be improved by making corresponding sides of the lightguide non-reflecting, e.g. absorbing. If the sides were reflective, further images towards the sides of the lamp would be created, which would take away the dark sidewall.

The dark vertical bands between the virtual images may be made larger and smaller. To do so, the individual LEDs need to be positioned further apart. The horizontal bands may be made larger by positioning the extraction features further apart, or by limiting the angles at which total internal reflection can occur, because in that case the bundle of light in the lightguide will be narrower.

Figure 4:
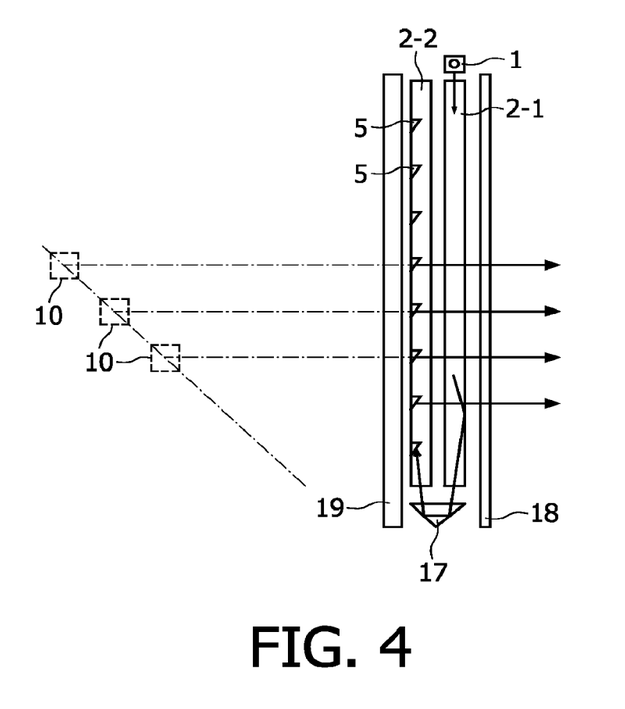
FIG. 4 diagrammatically shows another embodiment of the lamp of the invention.

FIG. 4 diagrammatically shows another embodiment of the lamp of the invention. Herein, as in all Figures, similar parts have the same reference numerals. The lamp comprises a lightguide with a first lightguide part 2-1 and a second lightguide part 2-2. A prism 17, a circular polarizer and a mirror 19 are also provided.

This lamp comprises a LED 1 that emits light into the first lightguide part 2-1, without any extraction features. Hence, the light will be guided towards the opposite end. There, the light will enter the prism 17, by which it will be totally reflected into the second lightguide part 2-2, which does have extraction features 5. These will create virtual images 10 of the LED, but now at a much larger perceived distance. The lamp, which is still very flat, now has a very large virtual depth. Note that the prism 17 may also be integral with the first and second lightguide parts 2-1 and 2-2, to minimize losses.

Furthermore, circular polarizer 18 and mirror 19 co-operate to suppress reflections of ambient light. The circular polarizer 18 absorbs all incident light except for light with a certain (circular) polarization. Ambient light with this polarization is transmitted by the polarizer, and also by the lightguide parts 2-1 and 2-2, and finally is incident on minor 19. This may flip the polarization of the light, which will now, after again passing the lightguide parts, be absorbed by the polarizer. Hence all ambient light is effectively absorbed. Since only half of the light that is extracted by the structures 5 is absorbed by the polarizer, the ratio between ambient (reflected) light and emitted light is improved many times.

The feature of a side-lit lightguide with extraction features and a combination of a circular polarizer in front of the lightguide and a mirror at the opposite side in general provides a lamp with such suppressed ambient reflections and an improved ratio of reflected and emitted light.

Figure 5:
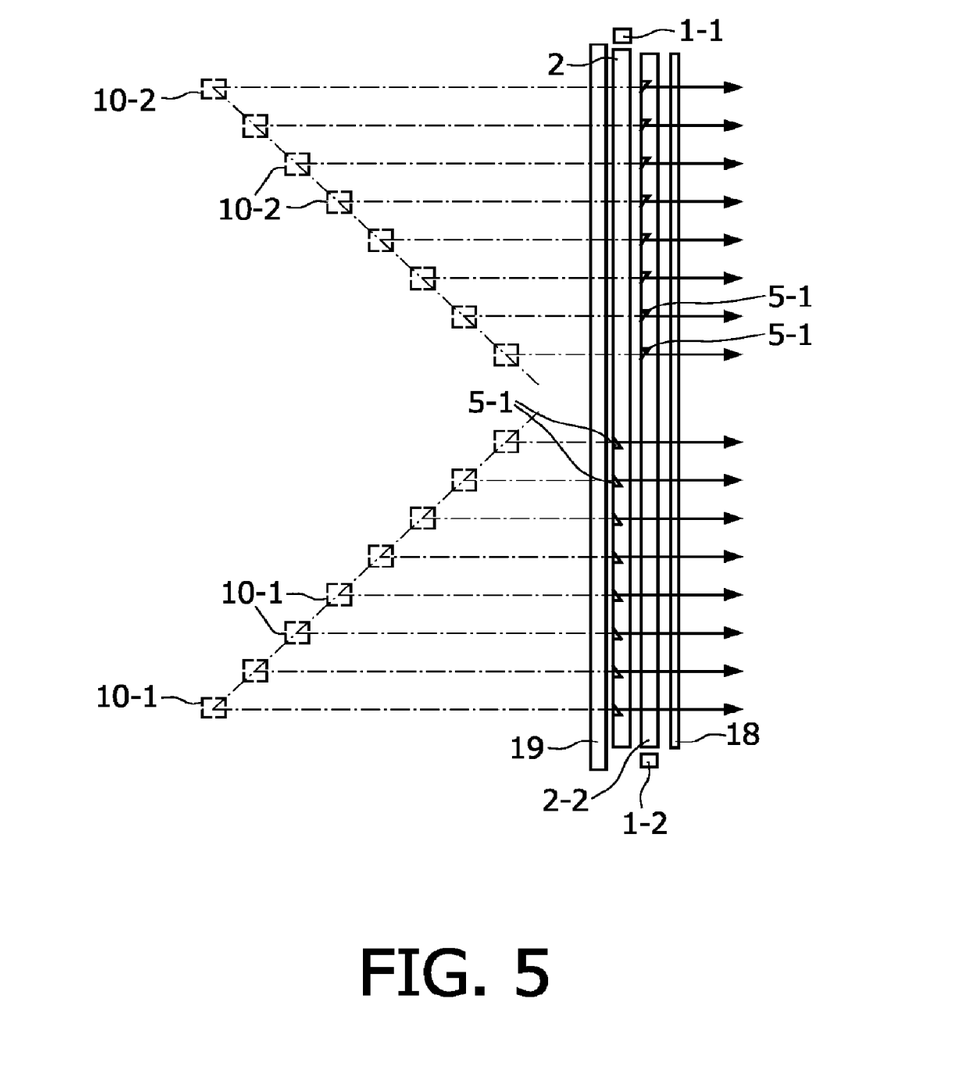
FIG. 5 shows another embodiment of the lamp of the invention, comprising first and second (arrays of) LEDs 1-1 and 1-2, lightguides 2-1 and 2-2, extraction structures 5-1 and 5-2, creating virtual LED images 10-1 and 10-2.

FIG. 5 shows another embodiment of the lamp of the invention, comprising first and second (arrays of) LEDs 1-1 and 1-2, lightguides 2-1 and 2-2, extraction structures 5-1 and 5-2, creating virtual LED images 10-1 and 10-2.

The principle of this lamp will be clear from the foregoing. Note that the lightguides have, at their respective end nearest the LEDs, a part that is free from extraction structures, in order to prevent overlapping virtual images.

The lamp shown here has an even larger (average) perceived depth, because at those locations where a single-lightguide lamp would show a small depth, the second, overlapping lightguide takes over the creation of the virtual images. The perceived shape will be V-shaped, with the apex nearest the viewer in the center of the lamp.

On the basis of the principles as disclosed and illustrated above, the skilled person will be able to design many more variations.

Figure 6:
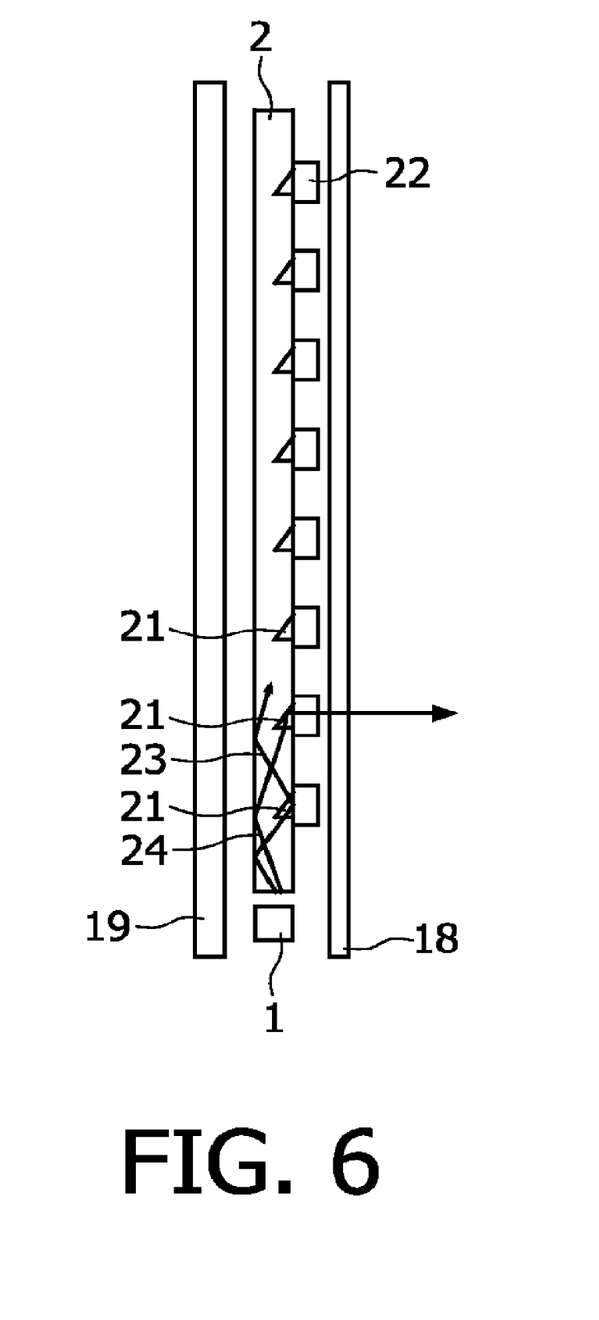
FIG. 6 diagrammatically shows a cross-sectional view of another embodiment of a lamp according to the invention.

FIG. 6 diagrammatically shows a cross-sectional view of another embodiment of a lamp according to the invention. This lamp has a high ratio between reflected ambient light, which is effectively suppressed, and emitted light.

In this embodiment, the lamp comprises, apart from the by now well-known parts, extraction structures 21 in the form of e.g. prismatic recesses filled with birefringent material, and layers 22 of another birefringent material.

The extraction structures 21 comprise a birefringent material, with first and second refractive indices for the two polarization axes. One of those refractive indices matches the refractive index of the material of the lightguide 2, while the other is either lower or higher. In this case, the lightguide 2 could be made from glass, with n=±1.5, while the birefringent material could be calcite, with respective refractive indices of about 1.49 and 1.66. This means that rays with one type of polarization see only a perfect lightguide 2, and pass the extraction structure without seeing it. In the Figure this is ray 23. The rays with the other type of polarization, in the Figure ray 24, will be refracted, and thereafter extracted from the lightguide. However, the non-extracted light will always, at any time, change its polarization, e.g. through scattering at inevitable impurities or other surfaces. That light may then be extracted. In this way, the lamp will emit all of the light with a single polarization only.

The incident ambient light is suppressed in the same way as described above, and the lamp comprises a circular polarizer and a mirror for that reason. In order to be able to emit the linearly polarized light, such as ray 24, the lamp comprises further birefringent material 22, either deposited per structure 21, or (?) in the form of a patterned foil, et cetera. The material 22 rotates the polarization such that the light (?) can pass the polarizer 18. The retardation (or correspondingly the thickness) and polarization axis of the birefringent materials 21 and 22 should of course be adapted to the polarization axis of the polarizer 18.

The above embodiments are exemplary only, and should not be construed as limiting the invention. They serve only as a means for better understanding the invention.

The invention claimed is:

1. A lamp for emitting light, comprising
   a transparent substantially planar lightguide, having at least one light receiving side, a light emission front surface and a back surface opposite the front surface, the back surface comprising a plurality of optical extraction structures, and
   a plurality of light sources, positioned in an array and optically coupled to at least one light receiving side, wherein the lamp does not include any light-scattering structures in a path of the light when emitted thereby.

2. The lamp according to claim 1, wherein the front surface, the extraction structures and the back surface comprise optically flat surfaces.

3. The lamp according to claim 1, wherein the extraction structures comprise mirroring surfaces.

4. The lamp according to claim 1, wherein the extraction structures are separated by a distance of at least 2 mm.

5. The lamp according to claim 1, wherein the extraction structures are provided on parallel curved lines.

6. The lamp according to claim 1, wherein the sides of the lightguide that extend perpendicularly to the array of light sources are substantially non-reflecting.

7. The lamp according to claim 1, wherein the light sources comprise at least one of a plurality of LEDs, in particular a plurality of white light LEDs, and a light generating device with a plurality of optical fibers.

8. The lamp according to claim 1, wherein the plurality of light sources comprise a plurality of LEDs, at least two neighboring LEDs being arranged to emit light of a different color.

9. The lamp according to claim 1, wherein the array of light sources comprises an arrangement, extending in at least two dimensions.

10. The lamp according to claim 1, wherein a plurality of light sources are disposed on a curve.

11. The lamp according to claim 1, wherein the front surface is directly visible.

12. The lamp according to claim 1, wherein the lightguide comprises parallel first and second lightguide parts.

13. The lamp according to claim 12, further comprising two arrays of light sources, wherein respective light receiving sides of the first and second lightguide parts are optically connected to one of the two arrays of light sources.

14. The lamp according to claim 13, wherein the two arrays of light sources are arranged on opposite sides of the lamp.

15. The lamp according to claim 12, wherein the first lightguide part has a light receiving side positioned adjacent the array of light sources, and the second lightguide part is optically connected to the first lightguide part by means of a mirror device.

16. The lamp according to claim 12, wherein the first lightguide part is substantially free from extraction structures.

17. The lamp according to claim 12, wherein the first and second lightguide parts comprise a part at respective, mutually opposite light receiving sides thereof, that is free from extraction structures.

18. The lamp according to claim 1, further comprising two arrays of light sources, and two lightguides with extraction structures and with opposite light receiving sides.

* * * * *